Aug. 19, 1969  J. P. BURGARELLA  3,461,784
EXPOSURE CONTROL APPARATUS
Filed March 13, 1967

INVENTOR.
John P. Burgarella
BY
Brown and Mikulka
and
James L. Neal
ATTORNEYS

United States Patent Office 3,461,784
Patented Aug. 19, 1969

3,461,784
EXPOSURE CONTROL APPARATUS
John Paul Burgarella, Sudbury, Mass., assignor to Polaroid Corporation, Cambridge, Mass., a corporation of Delaware
Filed Mar. 13, 1967, Ser. No. 622,491
Int. Cl. G03b 9/64
U.S. Cl. 95—53.3                    4 Claims

ABSTRACT OF THE DISCLOSURE

A photographic shutter control apparatus includes separate leading and trailing blades. Elongated springs bias the leading and trailing shutter blades for movement from their reset positions to their rundown positions for producing a photographic exposure. Subsequent to each exposure the blades are returned to their reset positions. A keeper is flexibly attached to the trailing shutter blade. The biasing spring for moving the trailing blade bears directly against the keeper. During return of the shutter blades to their reset positions, the flexibly attached keeper is brought into contact with an electromagnet and mechanically retained in contact therewith. During exposure producing operation, the trailing blade is electromagnetically engaged to be held in its reset position after release of the leading blade for exposure initiating movement to its rundown position. Simultaneously the mechanical force for holding the trailing blade at its reset position is released. The flexibly mounted keeper and the biasing spring for the trailing blade cooperate to avoid shock which tends to occur when the mechanical holding force is released. Subsequently, the electromagnet is deenergized to release the trailing blade for exposure terminating movement.

CROSS-REFERENCE TO RELATED APPLICATION

This application describes reset and latching means disclosed and claimed in copending United States patent application Ser. No. 622,597, filed concurrently herewith in the name of Andrew S. Ivester.

BRIEF SUMMARY OF THE INVENTION

This invention contemplates use of exposure control apparatus including shutter means having a shutter blade adapted for exposure producing movement relative to an exposure aperture and means for controlling movement of the shutter blade constructed to prevent inadvertent or premature release of the shutter blade.

In one embodiment, the apparatus includes a shutter blade, a magnetizable means connected to the blade, spring means engageable with the keeper, reset means, and magnetic holding means cooperating with the keeper for holding the blade against movement until the instant for its release. The shutter blade is mounted for movement between an initial position and a terminal position for influencing exposure through an aperture. The blade is releasably held in the initial position by magnetic engagement between the keeper and the holding means. The spring means is stressed to bias the keeper and the blade in a forward direction and to move them from the initial blade position to the terminal blade position when the magnetic holding means releases the keeper. After each such exposure influencing movement of the shutter blade, reset means applies force to the shutter blade to advance it in the reverse direction, from the terminal position to the initial position, wherein the keeper again abuts the magnetic holding means. Operation of the reset means after the keeper abuts the holding means serves to urge the blade in the reverse direction and press the keeper into firm seating relationship with the holding means. The keeper is connected to the blade in a manner which permits limited relative movement therebetween so that the keeper may experience such movement upon being pressed against the holding means, to thereby avoid any possible misalignment relative to the holding means and firmly seat against the holding means for engagement thereby.

The manner of holding the blade in its initial position is important because the holding force between the holding means and the keeper should be kept at the lowest level which will effectively retain the blade in order to minimize the release time of the magnetic holding means. If the force on the keeper is characterized by a high reserve holding force, the release time of the blade will be variable and long.

In connection with use of the lowest effective holding force, it is important that blade, keeper, and biasing spring be connected so that the blade experiences no substantial biasing force in the forward direction when the reset forces urging it in the reverse direction are removed. If the spring force were applied directly to the blade, a residual forward blade bias would result immediately upon removal of the reset force, which residual bias would move the blade in the forward direction through the displacement permitted by the flexible connection. During movement the blade would acquire a kinetic energy approximately equal to the displacement of the blade multiplied by the force applied by the spring to the blade. Absorption of this energy, upon movement through the maximum displacement permitted between the blade and the keeper, could create a shock force which could result in the premature release of the blade, especially since the reserve holding force is kept low. On the other hand, application of the spring force directly to the keeper results in no directional bias upon the blade when the reset force is removed.

Thus, one advantage obtained by direct application of the biasing force to the keeper is that when the reset force is removed the blade experiences no directional bias.

Another advantage resulting from direct application of the biasing forces to the keeper is that it facilitates construction of a relatively uncomplicated and inexpensive blade characterized by a need for only one connecting or bearing member thereupon. Multiple connecting or bearing members which might otherwise be required would increase the mass of the blade and thus undesirably increase inertial delay of the blade upon release thereof for exposure influencing movement.

Use of the exposure control apparatus of this invention has particular advantages in two-bladed shutter applications in which opening and closing shutter blades are mounted for independent movement between initial and terminal positions for initiating and then terminating exposure through an aperture; keeper means is mounted upon the second blade; first spring means biases the first or opening shutter blade in a forward direction, from its initial position toward its terminal position; second drive means comprising an elongated spring engages the keeper and biases the second or closing blade in the forward direction from its initial position toward its terminal position; releasable magnetic means is mounted for magnetically engaging the keeper when the blades are in their initial positions to hold the second blade in its initial position independently of movement of the first blade; and reset means is provided for returning the shutter blades to their preexposure positions after production of each exposure.

Prior to exposure, both blades are held in their respective initial positions. The first blade is rearwardly biased by the reset means, into engagement with the second blade. The first blade may be retained in the rearwardly biased condition by any convenient means to thereby continually bias the second blade rearwardly and urge the keeper into the aforesaid firm seating relationship with the releasable magnetic holding means. To initiate an exposure interval, the first blade is released for forward movement under influence of the first spring means. After movement of the first blade, magnetic engagement between the keeper and the holding means retains the second blade in its initial positions for a period of time, after which the second blade is released for forward movement under influence of the second spring means, to end the exposure interval. Since the spring biasing force for the second blade is applied to the keeper, the second blade experiences no directional bias tending to cause it premature release when the first shutter blade moves from the aforesaid engagement therewith.

It is a primary object of this invention to provide an uncomplicated, reliable and inexpensive photographic exposure control apparatus.

It is another object of this invention to provide exposure control apparatus including uncomplicated, dependable shutter means having at least one shutter blade constructed to prevent inadvertent or premature release of the shutter blade.

A further object of this invention is to provide exposure control apparatus having at least one shutter blade means mounted for exposure influencing movement, reset means for returning the blade to its preexposure position subsequent to each exposure, magnetic holding means for releasably holding the blade in the preexposure position, and spring means for biasing the blade from the preexposure position in a manner avoiding premature release of the blade from the holding means.

Other objects of the invention will in part be obvious and will in part appear hereinafter.

BRIEF DESCRIPTION OF THE DRAWINGS

The invention accordingly comprises the apparatus possessing the construction, combination of elements and arrangement of parts which are exemplified in the following detailed disclosure of a preferred embodiment taken in connection with the accompanying drawings wherein.

DETAILED DESCRIPTION OF THE DRAWINGS

Figure 1:
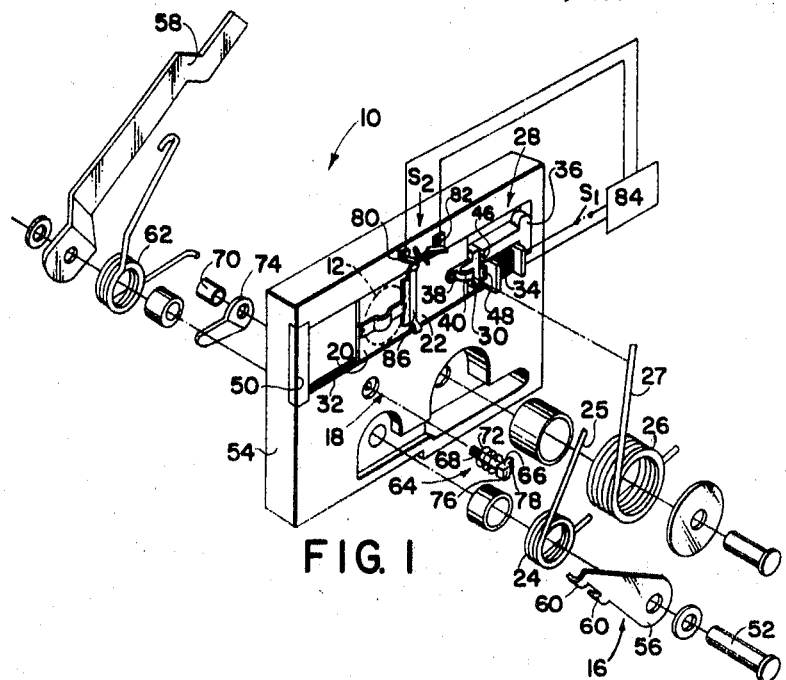
FIGURE 1 illustrates, in partially exploded perspective one embodiment of the photographic exposure control apparatus of the present invention.

Referring now to FIGURE 1, exposure control apparatus 10 is shown in partially exploded perspective as including exposure aperture 12, shutter means 14, reset mechanism 16, latch mechanism 18 and switch S2.

Shutter means 14 includes first shutter blade means 20, second shutter blade means 22, first spring drive means 24, second spring drive means 26, electro-mechanical holding means 28, and keeper means 30. The two shutter blades are mounted in juxtaposition with each other for independent movement along track 32 between initial and terminal positions. First spring means 24 includes elongated portion 25 and second spring means 26 includes elongated portion 27 for moving blades 20 and 22, respectively, from their initial positions to their terminal positions. Electromechanical holding means 28, including solenoid 34 and core 36, is mounted adjacent the initial position of blade 22 for controlling movement of blade 22 in a manner hereinafter described. The keeper is connected to blade 22 by means of pin 38 in a manner permitting relative movement between the keeper and the blade. The keeper includes channeled bearing surface 40, adapted to receive elongated portion 27 of spring means 26, and crowned surface 44, adapted for contact with surfaces 46 and 48 of core 36. When the shutter blades are in their initial positions, surface 44 of the keeper abuts surfaces 46 and 48 of U-shaped core 36, and shutter blade 20 abuts blade 22. Blade means 22 is thus positioned for unblocking aperture 12 and blade means 20 for blocking aperture 12 and blade means 20 for blocking the aperture. In their terminal positions, blade 20 abuts stop 50, in unblocking relationship with aperture 12, and blade 22 abuts stop 50, in unblocking relationship with aperture 12, and blade 22 abuts blade 20, in blocking relationship with aperture 12.

Reset apparatus 16 serves to advance shutter blades 20 and 22 from their terminal positions to their initial positions subsequent to exposure producing movement thereof. The reset apparatus may include rotatable shaft 52 extending through support 54, reset lever 56 mounted on one end of the shaft for movement along a path complementary to that of elongated spring portion 25, and reset actuator arm 58 mounted upon the opposite end of shaft 52. Reset lever 56 includes projections 60 extending into the path of movement of elongated spring portion 25 for selectively engaging portion 25 and imparting movement thereto against the bias of spring means 24. Spring 62 biases reset lever 56 to a rest position, out of engaging relationship with elongated portion 25.

Releasable retaining means 18 may include latch pin 64 having head portion 66 and shaft portion 68. Shaft portion 68 extends through support 54 and is reciprocally retained therein by nut 70. Spring 72 surrounds shaft 68 between head portion 66 and support 54 to bias latch pin 64 toward a raised position wherein head portion 66 extends into the path of movement of elongated portion 25 of spring drive means 24. Latch release lever 74 is mounted on shaft 52 between nut 70 and support 54 for selectively moving latch pin 64 against bias of spring 72 to a retracted position, out of the path of movement of elongated portion 25. Latch pin 64 includes cam surface 76 and seat 78. Cam surface 76 permits movement of elongated portion 25 of spring 24 past the latch pin 64, when the pin is raised, as the shutter blades are advanced from these terminal positions to their initial positions by reset apparatus 16. Seat 78 releasably engages elongated portion 25 to prevent return movement of the shutter blades to their terminal positions.

Switch S2 may include poles 80 and 82 wherein pole 80 is normally biased out of contact with pole 82 and adapted to be thrown into contact therewith in response to the presence of shutter blade 20 in its initial position. Switch S2 is operative in conjunction with timing circuit means 84 and the solenoid 34 included therein, for controlling exposure interval duration in a manner to be subsequently described.

Figure 2:
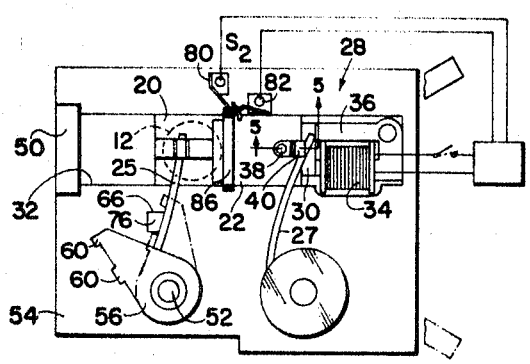
FIG. 2 is a plan view of the apparatus of FIGURE 1 prior to exposure producing operation thereof.
Figure 4:
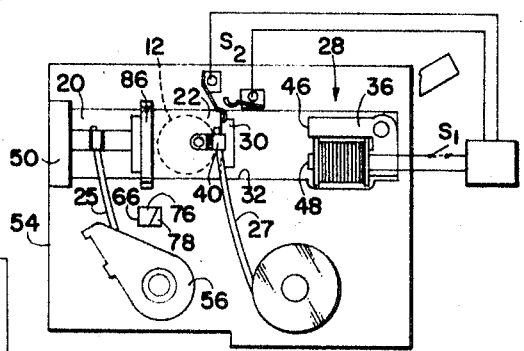
FIG. 4 shows a plan view of the apparatus of FIGURE 1 subsequent to exposure producing operation thereof.
Figure 3:
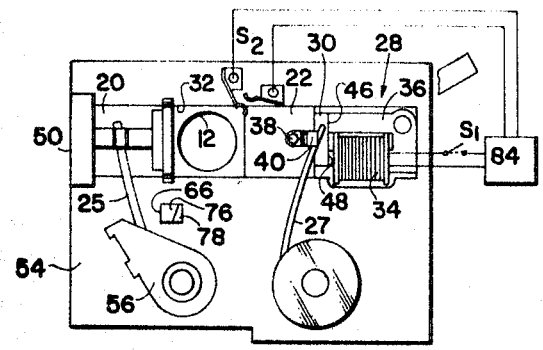
FIG. 3 is a plan view of the apparatus of FIGURE 1 showing the position obtained by elements thereof during exposure.

Prior to initiation of exposure apparatus 10 is as shown in FIG. 2 wherein blades 20 and 22 occupy their initial positions. Blade 20 is first moved in a forward direction from its initial position to its terminal position, while blade 22 remains in its initial position, to initiate exposure through aperture 12. This condition is shown in FIG. 3. In timed relationship to movement of blade 20, blade 22 is moved in the forward direction to its terminal position to end exposure. The latter condition is shown in FIG. 4. Exposure producing operation of the shutter blade means will be described in the detail below. After exposure production, when the apparatus is as shown in FIG. 4, shutter blades 20 and 22 must be reset to the initial positions shown in FIG. 2 for production of a subsequent exposure. To reset, actuator arm 58 is operated, against the bias of spring 62, to rotate shaft 52 and reset lever 56. Upon rotation of the reset lever, projections 60 engage portion 25 of spring 24 and advance it, against its bias, to advance blades 20 and 22 along track 32 from their terminal positions towards their initial positions.

During advancement, the zone of shutter means 14 which includes abutting surfaces of shutter blades 20 and 22 passes over the exposure aperture. Light-seal means 86, mounted upon blade means 20, is provided to cover the aforesaid zone to prevent light leakage which might otherwise occur during the reset operation.

Figure 5:
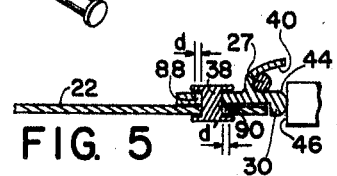
FIG. 5 is a view taken along section 5—5 of FIG. 2.

Advancement of spring portion 25 eventually causes it to strike and ride upon cam surface 76 of latch pin 64, at least partially depressing the latch pin against the action of spring 72. Shutter blades 20 and 22, releasable retaining means 18, and electromechanical holding means 28 are so arranged that keeper 30 strikes core 36 to block further movement of the shutter blades when they reach their respective initial positions, simultaneously with the aforesaid striking action of spring portion 25 upon cam surface 76. Overtravel of reset lever 56, subsequent to blocking of shutter blade movement, is permitted due to the flexibility of elongated portion 25 of spring 24. Overtravel of the reset lever flexes portion 25 to press blade 20 firmly against blade 22 and, overcoming the bias of spring means 26, blade 20 acts to press keeper 30 on blade 22 firmly against surfaces 46 and 48 of core 36. Pin 38 connecting keeper means 30 to blade 22 is slightly smaller than opening 88 in the keeper and opening 90 in blade 22, as shown in FIGURE 5. Differences in the relative dimensions of pin 38 and the openings are exaggerated in FIG. 5; the diameters of the openings may be, in practice, only a few thousandths of an inch larger than the diameter of the pin. This connection is thus flexible and permits some relative movement between blade 22 and the keeper. The keeper is permitted to rotate about the pin and thereby compensate for any small amount of misalignment which might otherwise exist between keeper 30 and core 36, so that the keeper will contact both surfaces 46 and 48 of the core. The connection between blade 22 and the keeper further permits fulcrumage to be applied to the keeper by the pin so that a certain amount of movement of the keeper about an axis substantially perpendicular to its axis of rotation about pin 38 is permitted. The fulcrumage, in cooperation with crowned surface 44, facilitates production of uniform contact between the keeper and surfaces 46 and 48. Preferably surfaces 46 and 48 are made flat so that the flat surfaces and crowned surface 44 of keeper 30 will meet substantially in line contact. Line contact is less sensitive to misalignment than is surface contact and will accommodate several degrees of misalignment without adverse affect upon magnetic engagement between the keeper and core 36 of holding means 28. The above described contact between keeper 30 and core 36 substantially eliminates the possibility of a gap developing between the keeper and the core and thereby facilitates production of a positive holding force on blade 22 when solenoid 34 of electromechanical holding means 28 is energized.

Further movement of reset lever 56 advances portion 25 of spring 24 past cam surface 76 of latch pin 64 to a position over seat 78. The latch pin then returns to raised position in response to the biasing action of spring 72 so that seat 78 engages portion 25 and maintains it in its flexed condition. Upon release of arm 58, spring 62 returns the arm lever 56 to their rest positions. Shutter blade means 14, latch mechanism 18 and reset mechanism 16 are thus reset to the configuration shown in FIG. 2.

To initiate exposure, release lever 74 is depressed to retract latch pin 64 against the bias of spring 72 and to substantially simultaneously close switch S1. Retraction of latch pin 64 releases portion 25 of spring 24 so that spring 24 drives shutter blade 20 towards its terminal position for unblocking aperture 12 and initiating exposure. Movement of blade 20 is halted in the terminal unblocking position thereof by stop means 50. Closure of switch S1 energizes timing circuit 84 and solenoid 34 of electromechanical holding means 28 to prevent forward movement of blade 22 according to the bias of spring 26, which movement would otherwise occur upon movement of blade 20. Energization of solenoid 34 provides, in the magnetic circuit of core 36 and keeper 30, a magnetic induction sufficiently large to create a force on the keeper for holding blade 22 in its initial position against the bias of spring 26 independently of movement of blade 20. Blades 20 and 22 now occupy the positions shown in FIG. 3.

Since the force of spring 26 is applied directly to keeper 30, blade 22 experiences no directional bias upon movement of blade 20. The advantage of direct application of the spring force to the keeper can best be seen by reference to FIG. 5. In reset condition, displacement is developed between the keeper and blade 22 which is approximately equal to the sum of the distance by which the diameter of opening 88 exceeds the diameter of pin 38 and the distance by which the diameter of opening 90 exceeds the diameter of the pin. The distances are represented on $d$ and $d'$, respectively.

Application of a spring force F directly to blade 22 would result in movement of that blade through displacement $(d+d')$ when blade 20 moves from the previously described firm contact with blade 22. The result would be acquisition of kinetic energy equal to the spring force multiplied by the displacement [i.e.; $KE=F(d+d')$]. Absorption of such energy might create a shock force having a magnitude greater than that of the magnetic inductive force required to hold the keeper to core 36, and thus produce premature release of blade 22. On the other hand, when the force F is applied directly to the keeper, blade 22 experiences no biasing force and thus no movement when blade 20 moves from the aforesaid contact with blade 32.

Simultaneously with initial aperture unblocking movement of blade 20, pole 80 of switch S2 breaks contact with pole 82 to initiate timing operation of timing circuit 84. The timing operation is completed a predetermined time interval after initiation thereof. Completion of the timing operation deenergizes solenoid 34 whereby elongated portion 27 of spring 26, acting on channel 40, advances blade 22 toward and to its terminal position for blocking aperture 12 and ending exposure. At the terminal position, blade 22 abuts opening blade 20 and is biased into continuous contact therewith by spring means 26. The apparatus is now returned to the configuration of FIG. 4.

Since human reaction time in depressing and releasing lever 74 substantially exceeds the longest exposure likely to be used under normal "snapshot" conditions, switch S1 will be closed for at least as long as the correct exposure time and will be released only after both blades 20 and 22 have reached their terminal positions. Upon release of lever 74, spring 72 expands to return latch pin 64 to raised position for extension into the path of portion 25 of spring 24.

It will be seen from the foregoing description that the described embodiment of the invention accomplishes the above-mentioned objects by providing an uncomplicated and inexpensive photographic exposure control apparatus including shutter means and apparatus for reliably controlling operation of the shutter means.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Exposure control apparatus for a photographic camera comprising:
   (a) shutter blade means mounted for movement from an initial position to a terminal position for influencing exposure along an optical axis;
   (b) magnetic means;

(c) means connecting said magnetic means to said blade means while permitting limited relative movement therebetween;

(d) magnetic holding means to releasably engage said magnetic means when said blade means is in said initial position for holding said blade means in said initial position; and (e) means engageable with said magnetic means biasing said magnetic means toward said terminal blade position for moving said blade means from said initial position to said terminal position when said magnetic means is released from said magnetic holding means, said blade means being free of directional bias resulting from the action of said blade moving means when said magnetic means is engaged by said magnetic holding means.

2. Exposure control apparatus according to claim 1 further comprising means applying force to said blade means when said blade means is in said terminal position for advancing said blade means and said magnetic means from said terminal blade position to said initial blade position for permitting releasable engagement between said magnetic means and said magnetic holding means to thereby hold said blade means in said initial position, whereby said blade means experiences no directional bias when said applied force is released.

3. Exposure control apparatus according to claim 1 wherein:

(a) said magnetic means comprises a keeper engageable by said magnetic holding means when said blade means is in said initial position, said keeper having an integral bearing surface; and (b) said blade moving means comprises an elongated spring member stressed to urge said blade means from its initial position to its terminal position, said spring member bearing at one end against said bearing surface.

4. Exposure control apparatus for a photographic camera comprising:

(a) first shutter blade means;

(b) means for moving said first blade means in a forward direction from an initial position to a terminal position to unblock a photographic aperture;

(c) second shutter blade means movable from an initial position to a terminal position to block said photographic aperture;

(d) magnetic keeper means;

(e) means connecting said magnetic keeper means to said second blade means while permitting limited relative movement therebetween;

(f) spring means engageable with said magnetic keeper means for biasing said keeper means in said forward direction, toward the terminal position of said second blade;

(g) means for releasably retaining said first blade means in its initial position, said first blade means engaging said second blade means for overcoming the spring bias upon said magnetic keeper means and retaining said second blade means in its initial position;

(h) magnetic holding means releasably engageable with said magnetic keeper means for overcoming the bias of said spring means and retaining said second blade means in its initial position when said first blade means is released, whereby said second blade means experiences no directional bias upon release of said first blade means; and (i) means for releasing said second blade after the lapse of a timed interval following release of said first blade means so that said biasing means moves said second blade means in said forward direction from its initial position to its terminal position.

References Cited
UNITED STATES PATENTS

| | | | |
|---|---|---|---|
| 2,267,794 | 12/1949 | Kosken | 95—55 |
| 3,191,511 | 6/1965 | Burgarella | 95—60 XR |

NORTON ANSHER, Primary Examiner

LEO H. McCORMICK, JR., Assistant Examiner

U.S. Cl. X.R.

95—53, 55